(12) United States Patent
Kawaguchi et al.

(10) Patent No.: US 7,102,259 B2
(45) Date of Patent: Sep. 5, 2006

(54) ROTOR OF A SYNCHRONOUS INDUCTION ELECTRIC MOTOR

(75) Inventors: Hitoshi Kawaguchi, Tokyo (JP); Yoshio Takita, Tokyo (JP); Hayato Yoshino, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 266 days.

(21) Appl. No.: 10/292,505

(22) Filed: Nov. 13, 2002

(65) Prior Publication Data

US 2003/0173861 A1    Sep. 18, 2003

(30) Foreign Application Priority Data

Nov. 15, 2001  (JP)  ............................. 2001-349683

(51) Int. Cl.
*H02K 1/26* (2006.01)
*H02K 1/22* (2006.01)
*H02K 19/02* (2006.01)

(52) U.S. Cl. ...................... 310/61; 310/60 A; 310/166; 310/261

(58) Field of Classification Search ................ 310/210, 310/211, 212, 213, 162, 163, 166, 168, 156.53, 310/156.56, 261, 60 A, 61, 216, 217
See application file for complete search history.

(56) References Cited

U.S. PATENT DOCUMENTS

| | | | | |
|---|---|---|---|---|
| 406,777 | A | * | 7/1889 | Schmid ........................ 310/61 |
| 2,802,124 | A | * | 8/1957 | Sjoblom ..................... 310/211 |
| 2,846,601 | A | * | 8/1958 | Jacobs ........................ 310/211 |
| 2,913,607 | A | * | 11/1959 | Douglas et al. ............. 310/261 |
| 2,975,310 | A | * | 3/1961 | Armstrong et al. ......... 310/163 |
| 3,045,135 | A | * | 7/1962 | Honsinger ................... 310/212 |
| 3,047,755 | A | * | 7/1962 | Angst et al. ................ 310/162 |
| 3,210,584 | A | * | 10/1965 | Jorgensen et al. .......... 310/265 |
| 3,652,885 | A | * | 3/1972 | Honsinger ................... 310/163 |
| 3,778,652 | A | * | 12/1973 | Endress ...................... 310/211 |
| 3,862,446 | A | * | 1/1975 | Hilgeman et al. .......... 310/163 |
| 4,358,696 | A | * | 11/1982 | Liu et al. ................. 310/156.84 |
| 4,922,152 | A | * | 5/1990 | Gleghorn et al. ....... 310/156.84 |
| 5,859,483 | A | * | 1/1999 | Kliman et al. ................. 310/58 |
| 5,893,205 | A | * | 4/1999 | McClelland .................. 29/598 |
| 5,952,757 | A | * | 9/1999 | Boyd, Jr. ................ 310/156.81 |
| 6,259,181 | B1 | * | 7/2001 | Kawano et al. ............. 310/162 |
| 6,324,085 | B1 | * | 11/2001 | Kimura et al. .............. 363/132 |
| 6,515,395 | B1 | * | 2/2003 | Jansen ........................ 310/211 |
| 6,675,460 | B1 | * | 1/2004 | Reiter et al. .................. 29/596 |

(Continued)

FOREIGN PATENT DOCUMENTS

GB    2023459 A  *  6/1978

(Continued)

OTHER PUBLICATIONS

Translation of Nakai, JP04344153.*

*Primary Examiner*—Darren Schuberg
*Assistant Examiner*—David W. Scheuermann
(74) *Attorney, Agent, or Firm*—Oblon, Spivak, McClelland, Maier & Neustadt, P.C.

(57) ABSTRACT

A rotor of a synchronous induction electric motor according to the present invention includes a slot for generating induction torque and a slit for generating reluctance torque. The slot and the slit are filled up with aluminum which is short-circuited by an end-ring at each of both ends of the rotor, and the slit includes a non-filling part penetrating in the direction of the rotational axis and not filled up with the aluminum.

13 Claims, 6 Drawing Sheets

U.S. PATENT DOCUMENTS

| | | | |
|---|---|---|---|
| 6,849,983 B1 * | 2/2005 | Tajima et al. | 310/166 |
| 2003/0107288 A1 * | 6/2003 | Takita et al. | 310/211 |
| 2003/0173861 A1 * | 9/2003 | Kawaguchi et al. | 310/261 |
| 2003/0184185 A1 * | 10/2003 | Yoshino et al. | 310/261 |

FOREIGN PATENT DOCUMENTS

| | | | |
|---|---|---|---|
| JP | 57-65575 | | 10/1980 |
| JP | 56150786 | * | 9/1981 |
| JP | 57202854 | * | 12/1982 |
| JP | 60-79242 | | 6/1985 |
| JP | 61170253 | * | 7/1986 |
| JP | 61177146 | * | 8/1986 |
| JP | 63-158515 | | 10/1988 |
| JP | 64-36581 | | 3/1989 |
| JP | 02299436 | * | 12/1990 |
| JP | 04344153 | * | 11/1992 |
| JP | 05244742 | * | 9/1993 |
| JP | 5-347293 | | 12/1993 |
| JP | 06038468 | * | 2/1994 |
| JP | 06245445 | * | 9/1994 |
| JP | 08214481 | * | 8/1996 |
| JP | 08336250 | * | 12/1996 |
| JP | 09285052 | * | 10/1997 |
| JP | 11155267 | * | 6/1999 |
| JP | 2000-270525 | | 9/2000 |
| JP | 2001-186735 | | 7/2001 |
| JP | 2001-211617 | | 8/2001 |
| JP | 2001-238418 | | 8/2001 |
| JP | 2001-259790 | | 9/2001 |
| JP | 2002136080 | * | 5/2002 |
| JP | 2003153511 | * | 5/2003 |
| JP | 2003158839 | * | 5/2003 |

* cited by examiner

8:END-RING

7:ALUMINUM
4
5:SLOT PART
6:SLIT PART
9
8

ROTOR OF A SYNCHRONOUS INDUCTION ELECTRIC MOTOR

BACKGROUND OF THE INVENTION

1. Field of the Invention

The present invention relates to a structure of a gas vent hole formed in a rotor of a synchronous induction electric motor which is started by mainly utilizing induction torque and in which a synchronous operation is performed by utilizing reluctance torque. The synchronous induction electric motor is used for a sealed type compressor etc.

2. Description of Related Art

As described in the document such as Utility Model Gazette No. 64-36581, a gas vent hole is provided in a rotor of an electric motor used for a sealed type compressor in order to enhance the efficiency of the sealed type compressor and reduce a pressure loss by way of making refrigerant gas pass better. In this case, the type of the electric motor is an induction electric motor, or a brushless DC motor in which a permanent magnet is used for the rotor.

Also, as described in Utility Model Gazette No. 64-36581, an oil shielding board is provided at the exit of the gas vent hole of the rotor so that lubricating oil in the sealed type compressor, which is mixed with refrigerant gas and tends to circulate into a refrigerant circuit, may be lessened. This aims at reducing oil lack in the sealed type compressor and enhancing the efficiency of the refrigerating cycle.

As mentioned above, it is necessary to provide a gas vent hole which makes refrigerant gas pass, in the rotor of the electric motor used for a sealed type compressor. It is also necessary to provide a gas vent hole when a synchronous induction electric motor where a rotor slit to generate reluctance torque is filled up with aluminum and both ends of the rotor are short-circuited by end-rings is used for a sealed type compressor. However, since the slit formed in the rotor is filled up with aluminum, it is difficult to provide a hole in the slit part. Furthermore, since the portion without the slit is a place where magnetic bundle passes, if a hole is shaped in such a portion, there will be a problem of increasing magnetic resistance to cause an output fall and efficiency decrease.

SUMMARY OF THE INVENTION

It is an object of the present invention to provide a rotor of a synchronous induction electric motor which has less possibility of increasing magnetic resistance to cause an output fall and efficiency decrease when a gas vent hole is provided in the rotor in order to use the synchronous induction electric motor for a sealed type compressor.

Furthermore, it is another object of the present invention to provide a gas vent hole in a rotor which can be applied to other electric motors as well as the synchronous induction electric motor and by which oil contained in refrigerant gas can be separated and amount of oil circulation in a refrigerant circuit can be reduced.

Moreover, it is another object of the present invention to provide an electric motor, a sealed type compressor, a refrigerator or an air conditioner which has high efficiency and is inexpensive by way of utilizing the rotor of the synchronous induction electric motor and the gas vent hole of the rotor above-mentioned.

According to one aspect of the present invention, a rotor of a synchronous induction electric motor includes a slot for generating induction torque and a slit for generating reluctance torque. The slot and the slit are filled up with aluminum which is short-circuited by the end-ring at each of both ends of the rotor, and the slit includes a non-filling part penetrating in the direction of a rotational axis and not filled up with the aluminum.

According to another aspect of the present invention, a rotor of a synchronous induction electric motor includes a slot for generating induction torque and a slit for generating reluctance torque. The slot and the slit are filled up with aluminum which is short-circuited by the end-ring at each of both ends of the rotor, and the rotor includes a gas vent hole penetrating in the direction of a rotational axis and shaped to make magnetic resistance in the direction of d-axis small as much as possible.

According to another aspect of the present invention, a rotor of an electric motor includes a layered steel plate made by layering one or a plurality of electro-magnetic steel plates, in which a gas vent hole penetrating in the direction of a rotational axis and being concavo-convex inside is formed.

According to another aspect of the present invention, a rotor of an electric motor including a layered steel plate made by layering one or a plurality of electro-magnetic steel plates, includes a gas vent hole penetrating in the direction of a rotational axis and formed in the layered steel plate. The gas vent hole is wholly open at the entrance side of a gas flow, and a part inside the gas vent hole, at the outer circumferential side of the rotor, is closed at the exit side of the gas flow.

According to one aspect of the present invention, a producing method of a rotor of a synchronous induction electric motor, wherein a slot for generating induction torque and a slit for generating reluctance torque are included, the slot and the slit are filled up with aluminum which is short-circuited by the end-ring at each of both ends of the rotor, and the slit includes a non-filling part penetrating in the direction of a rotational axis and not filled up with the aluminum, the producing method includes:

when the slot and the slit of the rotor are filled up with the aluminum by die-casting, putting a plate-type mold onto the non-filling part beforehand, performing the die-casting, and taking the plate-type mold out when taking the rotor out of a mold of the die-casting.

The above-mentioned and other objects, features, and advantages of the present invention will be made more apparent by reference to the following detailed description when taken in conjunction with the accompanying drawings.

DETAILED DESCRIPTION OF PREFERRED EMBODIMENTS

Figure 1:
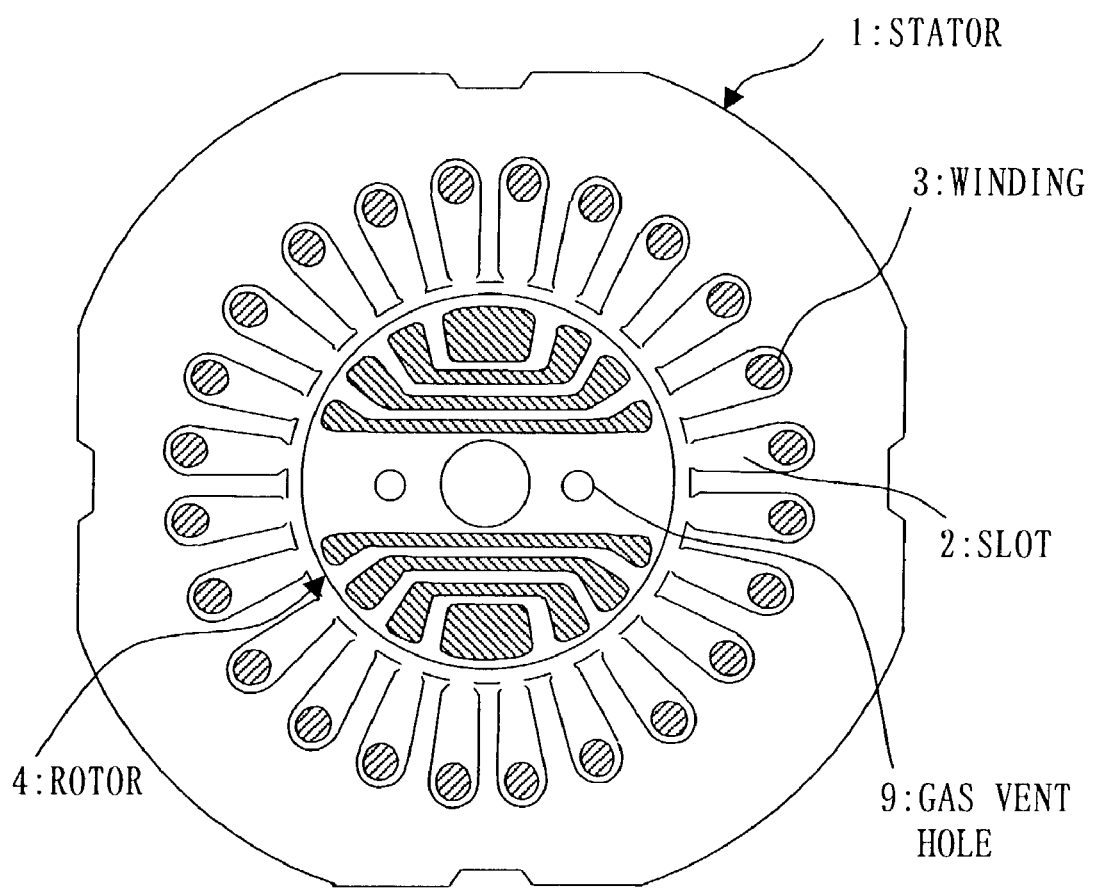
FIG. 1 shows a transverse sectional view of a stator and a rotor of a synchronous induction electric motor according to Embodiment 1.

Embodiments of the present invention will be explained referring to the drawings.

Embodiment 1

Figure 2:
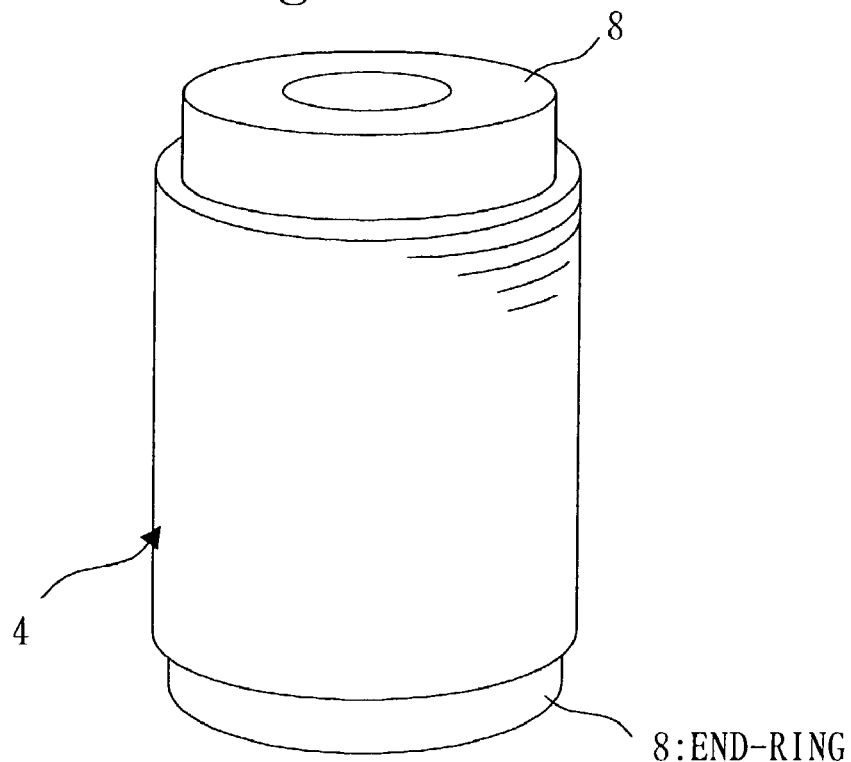
FIG. 2 shows a perspective view of the rotor of the synchronous induction electric motor according to Embodiment 1.
Figure 3:
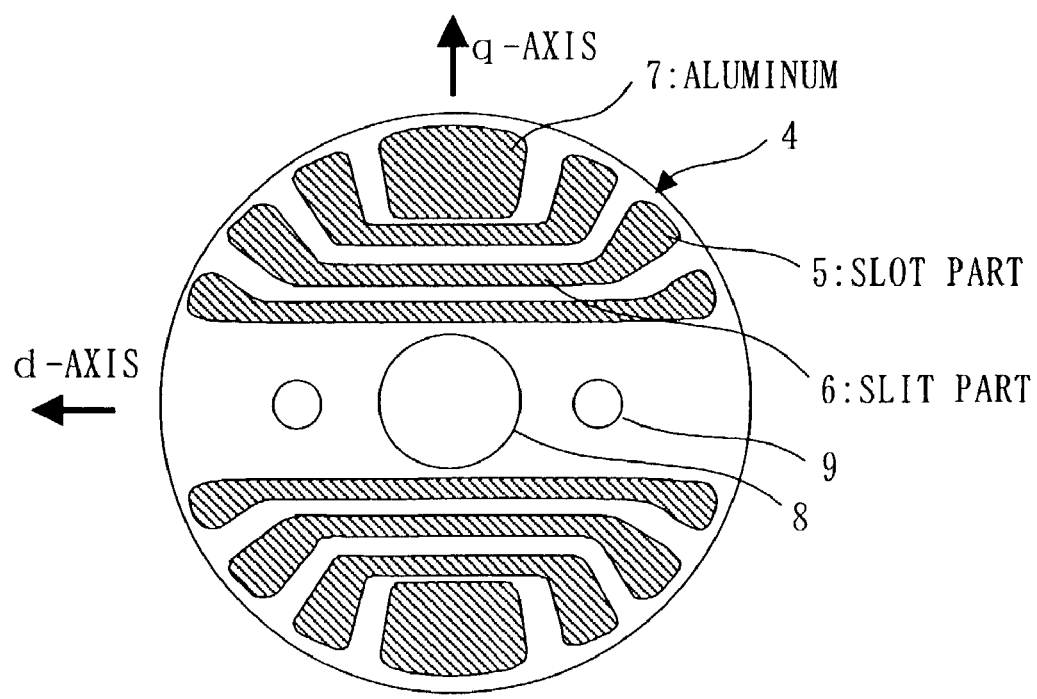
FIG. 3 shows a transverse sectional view of the rotor of the synchronous induction electric motor according to Embodiment 1.
Figure 4:
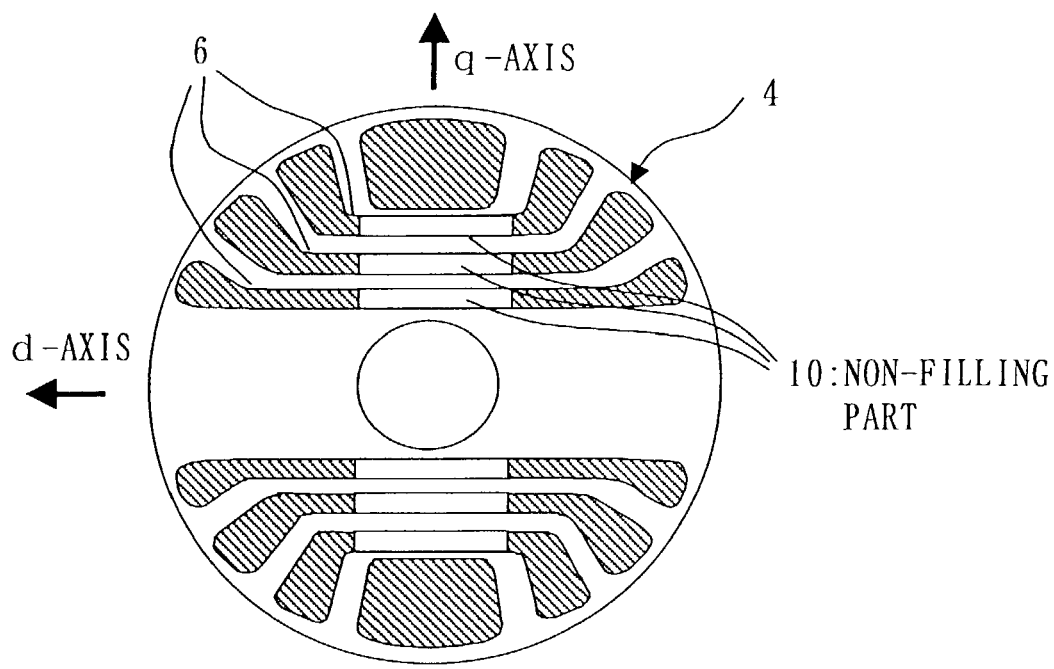
FIG. 4 shows a transverse sectional view of the rotor of the synchronous induction electric motor where a non-filling part is formed at a slit, according to Embodiment 1.

FIGS. 1 through 4 illustrate Embodiment 1. FIG. 1 shows a transverse sectional view of a stator and a rotor of a synchronous induction electric motor, FIG. 2 shows a perspective view of the rotor of the synchronous induction electric motor, FIG. 3 shows a transverse sectional view of the rotor of the synchronous induction electric motor, and FIG. 4 shows a transverse sectional view of the rotor of the synchronous induction electric motor where a non-filling part is formed at a slit.

In FIGS. 1 through 3, a stator 1 of the synchronous induction electric motor, a plurality of slots 2 provided at the inner circumferential side of the stator 1, windings 3, and a rotor 4 are provided. The winding 3 is wound at each of the plurality of slots 2 in order to generate magnetic flux for rotating the rotor 4. The rotor 4 is located inside the stator 1 and includes a slot part 5 for generating induction torque and a slit part 6 for generating reluctance torque. The slot part 5 and the slit part 6 are united, and filled up with aluminum 7 as a conductor.

As shown in FIG. 2, the aluminum 7 filling the slot part 5 and the aluminum 7 filling the slit part 6 become combined by an end-ring 8 and short-circuited by the end-ring 8. A gas vent hole 9 formed in the rotor 4 and penetrating in the direction of the rotational axis is provided in order to make refrigerant gas containing lubricating oil easily pass the electric motor part, which aims at using the synchronous induction electric motor for a sealed type compressor.

According to the synchronous induction electric motor of the present Embodiment, the slit parts 6 in parallel to the d-axis, as shown in FIG. 3 for instance, are provided in the rotor 4 in order to generate reluctance torque. Reluctance torque T in formula (1) stated below can be calculated based on a difference between inductance Lq in the direction of the q-axis and inductance Ld in the direction of the d-axis generated by using the windings in the stator in FIG. 3.

$$T=(Ld-Lq)IdIq \quad (1)$$

Id and Iq are electric current values in the case of decomposing the electric current generated by using the windings in the stator into a d-axis component and a q-axis component. The d-axis and the q-axis are in an orthogonal relation.

As the synchronous induction electric motor according to the present Embodiment is started by induction torque generated in the slot part 5 and performs synchronous operation by reluctance torque generated by the slit part 6, it is not necessary to specially provide starting equipment. Namely, the synchronous induction electric motor according to the present Embodiment is excellent because it efficiently performs synchronous operation.

As mentioned above, the reluctance torque T in the synchronous induction electric motor according to the present Embodiment can be calculated by the formula (1). Therefore, when necessary to generate large reluctance torque, the difference between Ld and Lq needs to be large as much as possible. Namely, it becomes necessary to make the d-axis component of magnetic resistance small. If the gas vent holes 9 are located in the direction of the d-axis at the portion where no slit part 6 exists as shown in FIG. 3, the magnetic resistance increases and the inductance Ld in the d-axis direction generated by using the windings in the stator is lessened. Consequently, as generated torque decreases, it becomes necessary to flow much current in order to obtain required torque, which makes the motor inefficient.

Then, a non-filling part 10 where no aluminum is filled up is provided at a part of the slit part 6 as shown in FIG. 4. This non-filling part 10 is used as a gas vent hole needed for a sealed type compressor. In FIG. 4, the non-filling part 10 is formed around the center of each slit part 6, penetrates in the direction of the rotational axis and functions as a gas vent hole. However, the non-filling part 10 can be formed anywhere in the slit part 6.

By dint of the structure stated above, as there is no gas vent hole in the direction of the d-axis in the portion where no slit part 6 exists, the magnetic resistance decreases. Therefore, it is possible to make the inductance Ld in the d-axis direction generated by using the windings in the stator large. Then, generated torque increases. Consequently, the electric current needed for obtaining required torque can be less, which makes the motor efficient.

Regarding a producing method of the non-filling part 10, the following can be explained as an example. When the slot part 5 and the slit part 6 of the rotor are filled up with aluminum 7 by way of die-casting, a plate-type mold is inserted in advance onto the slit part 6 where no aluminum 7 is to be filled up. Then, die-casting is performed. When taking the rotor 4 out of the mold, the plate-type mold can also be taken out. By dint of this process, the non-filling part 10 where no aluminum is filled up can be easily formed.

Embodiment 2

Figure 5:
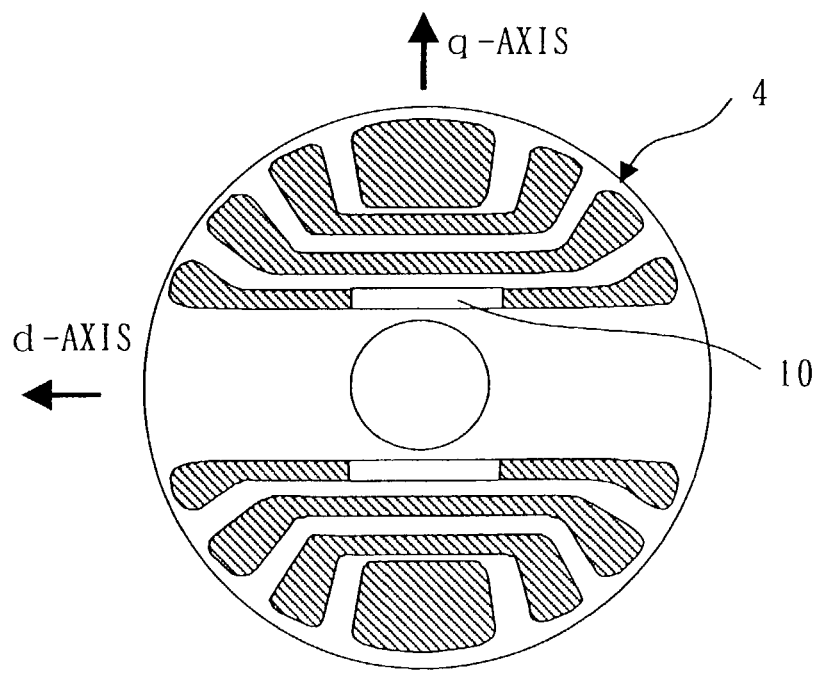
FIG. 5 shows a transverse sectional view of a rotor of a synchronous induction electric motor according to Embodiment 2.

FIG. 5 shows a transverse sectional view of a rotor of a synchronous induction electric motor according to Embodiment 2. As shown in FIG. 5, the non-filling part 10 is provided in the slit part 6 which is the closest to the center of the rotor 4.

As structured above, the amount of aluminum of the end-ring 8 which functions as a rotor of the induction electric motor is not reduced. Therefore, it is possible to make secondary resistance of the rotor small and torque which is as an induction electric motor at a small slide area large. Accordingly, the operation led to synchronous operation from motor starting can be stably performed.

Moreover, when the synchronous induction electric motor is used for the sealed type compressor, rotation velocity of the non-filling part 10, which functions as a gas vent hole, becomes slow in the case of the non-filling part 10 being located close to the center of the rotor. Therefore, it is possible to reduce pressure loss of refrigerant gas passing through the non-filling part 10.

In the present Embodiment, the non-filling part 10 is provided in the slit part 6 which is the closest to the center of the rotor 4. The same effect can also be obtained by providing the non-filling part 10 in the slit part 6 which is close, but not the closest, to the center of the rotor 4.

Embodiment 3

Figure 6:
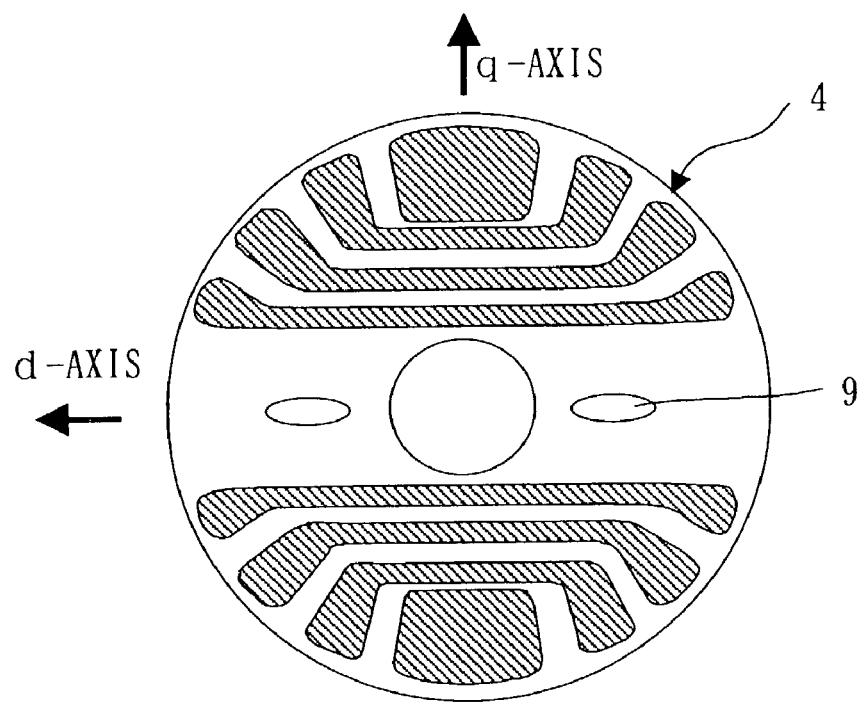
FIG. 6 shows a transverse sectional view of a rotor of a synchronous induction electric motor according to Embodiment 3.

FIG. 6 shows a transverse sectional view of a rotor of a synchronous induction electric motor according to Embodiment 3. As shown in FIG. 6, two gas vent holes 9 in the shape of an oval are provided in the direction of the d-axis and in the radial direction, and each of the gas vent holes is in the shape of an oval and a long hole along the d-axis direction and the radial direction.

By dint of the structure described above, the increase of magnetic resistance in the direction of the d-axis at the portion which contributes to the reluctance torque generated by providing the gas vent hole 9 can be suppressed as much as possible. Then, the decrease of the inductance Ld in the direction of the d-axis generated by using the windings in the stator can also be suppressed as much as possible. Consequently, the reluctance torque becomes large, which makes the synchronous induction electric motor efficient. Moreover, since the torque can be large by a rotor whose height of the rotor is small, it is possible to realize downsizing and lowering cost.

Although providing a gas vent hole 9 in the shape of an oval is described in the present Embodiment stated above, it is not limited to the oval. Other shape is acceptable as long as the decrease of the inductance Ld in the direction of the d-axis generated by using the windings in the stator can be suppressed as much as possible.

Embodiment 4

Figure 7:
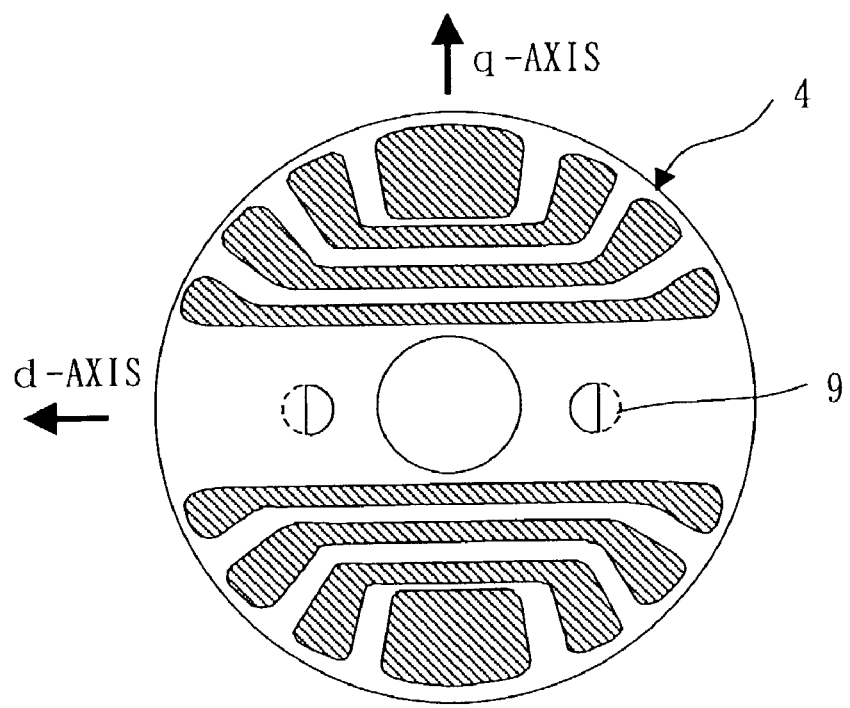
FIG. 7 shows a transverse sectional view of a rotor of a synchronous induction electric motor according to Embodiment 4.
Figure 8:
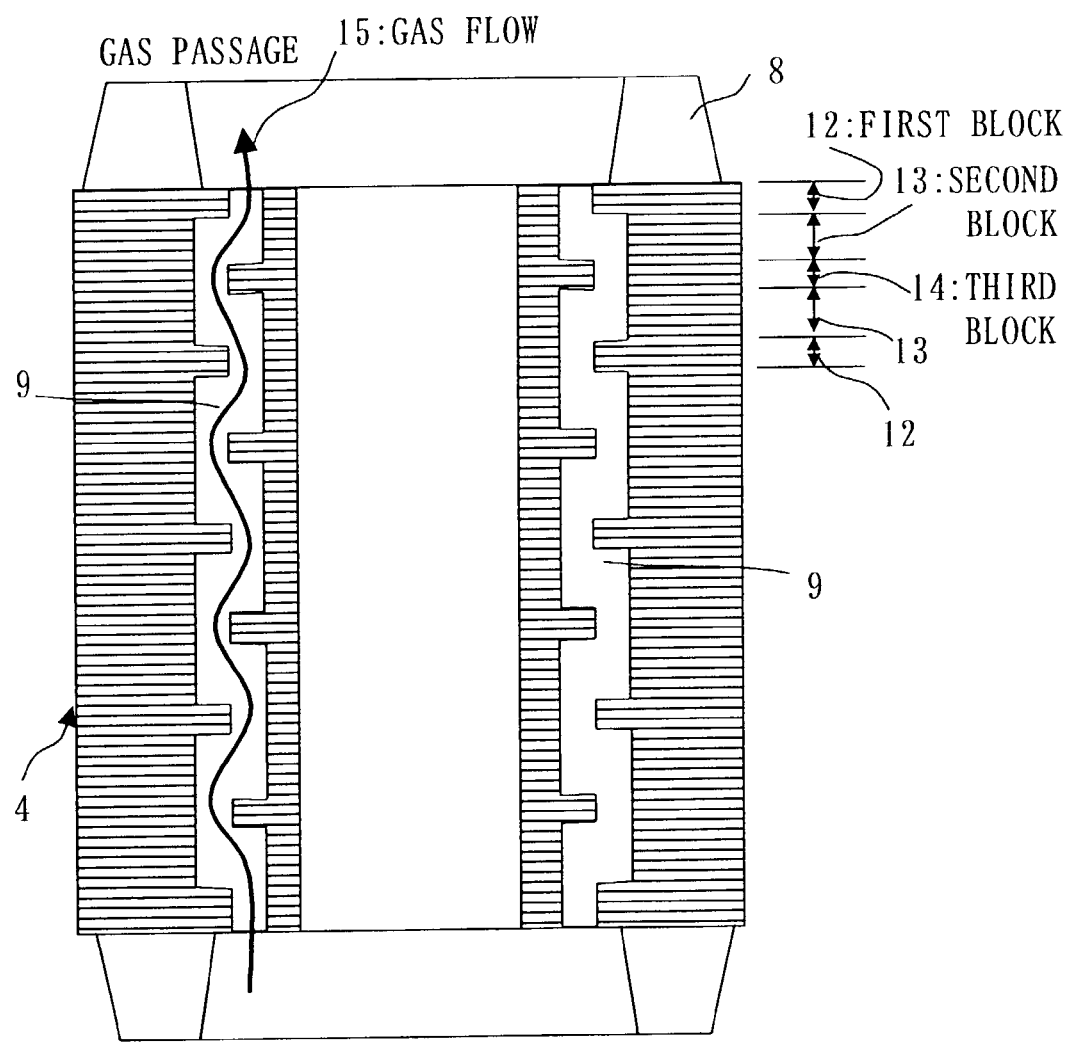
FIG. 8 shows a longitudinal sectional view of the rotor of the synchronous induction electric motor according to Embodiment 4.

FIGS. 7 and 8 illustrate Embodiment 4. FIG. 7 shows a transverse sectional view of a rotor of a synchronous induction electric motor, and FIG. 8 shows a longitudinal sectional view of the rotor of the synchronous induction electric motor. FIG. 7, showing a gas vent hole in the rotor seen from the upside or the downside, illustrates the exit side where gas flows out when the synchronous induction electric motor according to the present Embodiment is built in a sealed type compressor. A semicircular hole can be seen in FIG. 7, and it is shown by the dotted line that there is a cylindrical hole inside.

The structure of the gas vent hole 9 will be explained referring to FIG. 8. One or a plurality of electro-magnetic steel plates, punched out to be a shape of a rotor having two gas vent holes in the shape of a semicircular, is layered to form a block. This block is defined to be a first block 12. Next, one or a plurality of electro-magnetic steel plates, punched out to be a shape of a rotor having two gas vent holes in the shape of a circular, is layered to form a block. This block is defined to be a second block 13. Then, one or a plurality of electro-magnetic steel plates, punched out to be a shape of a rotor having two gas vent holes of semicircles whose shape is opposite to that of the first block 12, is layered to form a block. This block is defined to be a third block 14.

Layering the three types of blocks above-mentioned in order of the first block 12, the second block 13, and the third block 14, the section of the gas vent hole 9 forms a concavo-convex (uneven) shape. The flow of gas passing through the gas vent hole 9 whose section is concavo-convex becomes zigzag as shown by an arrow 15.

Since the gas vent hole 9 is formed to be concavo-convex inside as mentioned above, in the case that the synchronous induction electric motor according to the present Embodiment is used for a sealed type compressor, lubricating oil contained in refrigerant gas is separated when the refrigerant gas passes the gas vent hole 9. Therefore, the amount of oil circulation in the refrigerant circuit can be reduced, which enhances the performance of the refrigerant circuit. Moreover, it is not necessary to separately install a board for oil separation, and it is possible to reduce the amount of lubricating oil enclosed in the sealed type compressor because there is little lubricating oil carried out of the sealed type compressor. Consequently, lowering the cost can be realized. Furthermore, as an oil reservoir part can be small, the sealed type compressor can be downsized. As little lubricating oil is carried out of the sealed type compressor, no seizure is generated in the sealed type compressor, which improves the reliability.

In the present Embodiment, a gas vent hole of a semicircle and a gas vent hole of a circle are combined to form the gas vent hole 9. However, it is not limited to the shape of a semicircle or a circle. Any shape can be acceptable as long as the section of the gas vent hole 9 forms a concavo-convex shape.

Moreover, in the present Embodiment, the synchronous induction electric motor has been explained as an example of an electric motor. However, it is not limited to the synchronous induction electric motor. For instance, it is acceptable to apply the present Embodiment to an induction electric motor, a brushless DC motor, etc.

Embodiment 5

Figure 9:
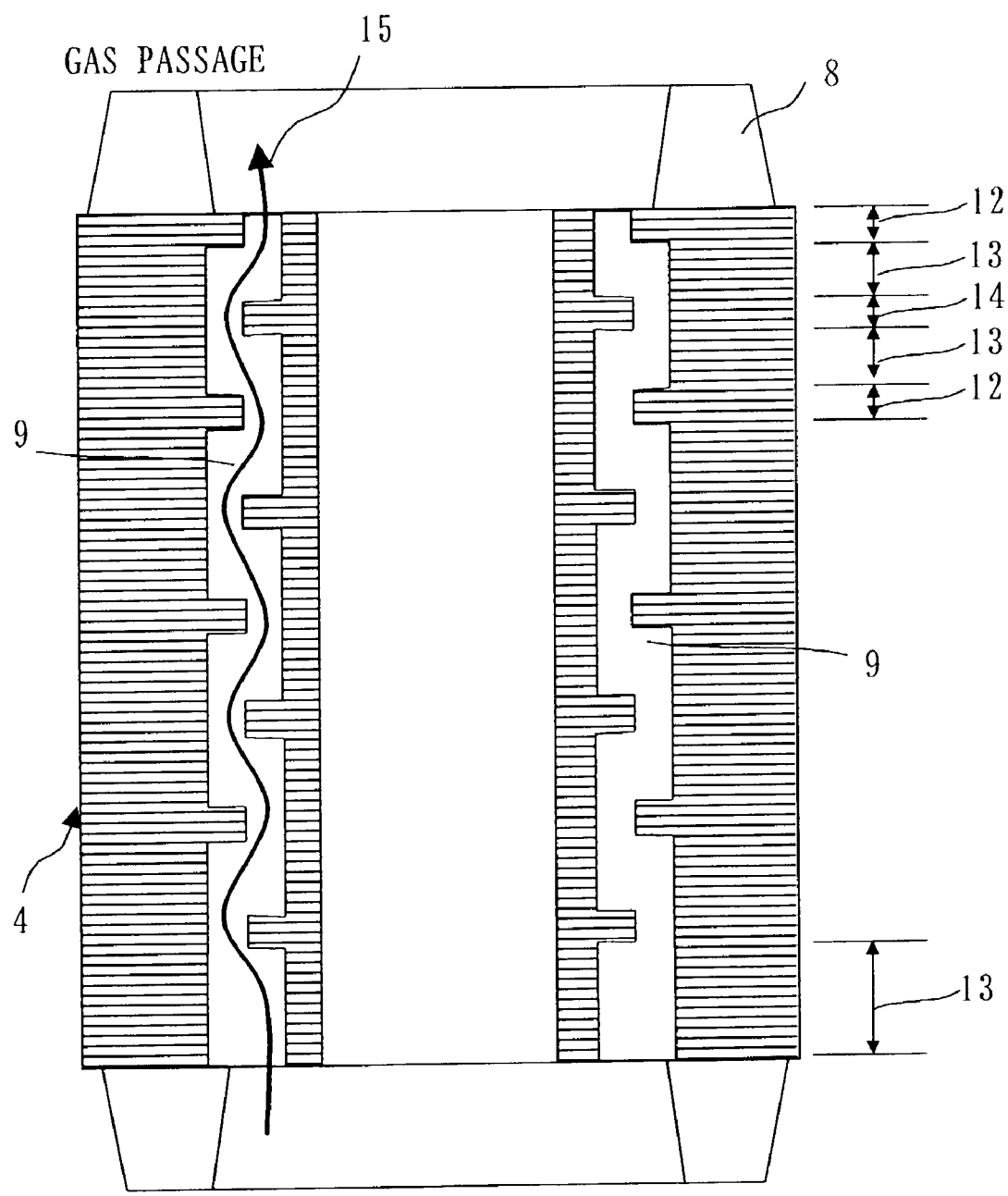
FIG. 9 shows a longitudinal sectional view of a rotor of a synchronous induction electric motor according to Embodiment 5.

FIG. 9 shows a longitudinal sectional view of a rotor of a synchronous induction electric motor according to Embodiment 5. In FIG. 9, as described in Embodiment 4, the three types of blocks, the first block 12, the second block 13, and the third block 14 are layered and the section of the gas vent hole 9 forms a concavo-convex shape. The shape of the gas vent holes at the exit of a refrigerant gas flow are semicircles, the semicircular gas vent holes are located at the inner circumferential side, and the shape of the gas vent holes at the entrance of the refrigerant gas flow are circles.

By dint of the structure stated above, when the synchronous induction electric motor according to the present Embodiment is used for a sealed type compressor, centrifugal force at the exit side prevents lubricating oil contained in refrigerant gas from going out of the rotor exit, and at the entrance side of the refrigerant gas, separated lubricating oil becomes easy to return into the sealed type compressor. Therefore, the refrigerant gas can smoothly pass, lubricating oil in the refrigerant gas can be separated, and the amount of oil circulation in the refrigerant circuit can be reduced, which improves the performance as a refrigerant circuit. Moreover, it is possible to reduce the amount of lubricating oil to be enclosed in the sealed type compressor because there is little lubricating oil carried out of the sealed type compressor, which realizes lowering the cost. Furthermore, as an oil reservoir part can be small, the sealed type compressor can be downsized. As little lubricating oil is carried out of the sealed type compressor, no seizure is generated in the sealed type compressor, which improves the reliability.

Also in the present Embodiment, the shape of the gas vent hole is not limited to a semicircle or a circle. Moreover, in the present Embodiment, the electric motor is not limited to the synchronous induction electric motor. For instance, it is acceptable to apply the present Embodiment to an induction electric motor, a brushless DC motor, etc.

Embodiment 6

It is also acceptable for the shape of the gas vent hole of the first block 12, the second block 13 and the third block 14 stated in Embodiments 4 and 5 to form a long hole in the direction of the d-axis and in the radial direction. In this case, the electric motor is a synchronous induction electric motor.

By dint of this structure, in addition to the effects of Embodiments 4 and 5, the increase of magnetic resistance in the direction of the d-axis at the portion which contributes to the reluctance torque generated by providing the gas vent hole 9 can be suppressed as much as possible. Then, the decrease of the inductance Ld in the direction of the d-axis generated by using the windings in the stator can also be suppressed as much as possible. Consequently, the reluctance torque becomes large, which makes the synchronous induction electric motor efficient. Moreover, since the reluctance torque can be large by a rotor whose layer width is further small, it is possible to realize downsizing and lowering cost.

Moreover, when the sealed type compressor, in which a synchronous induction electric motor or an induction electric motor, or a brushless DC motor according to the above Embodiments is provided, is applied to an air conditioner or a refrigerator, COP (coefficient of performance) of the sealed type compressor can go up because of the efficient electric motor. Accordingly, energy saving can be achieved in the product and the product of low cost can be offered.

In Embodiments 4 and 5, the gas vent hole which is concavo-convex inside is provided in the rotor. However, it is also acceptable to provide the gas vent hole being concavo-convex inside in the stator. In this case, the same effect can be obtained.

EFFECTS OF INVENTION

According to the rotor of the synchronous induction electric motor of the Embodiment of the present invention, the non-filling part penetrating in the direction of the rotational axis and not filled up with the aluminum is provided in the slit. As the non-filling part can be used as a gas vent hole, it is not necessary to provide a gas vent hole at a place which is in the direction of the d-axis and where no slit exists. Therefore, magnetic resistance can be decreased, and large reluctance torque can be obtained, which makes the motor efficient. Moreover, since the torque can be large by a rotor whose layer width is small, it is possible to realize downsizing and lowering cost.

According to the rotor of the synchronous induction electric motor of the Embodiment of the present invention, the non-filling part is provided at the slit which is close to the center of the rotor. Therefore, the amount of aluminum of the end-ring is not reduced. Then, it is possible to make torque which is as an induction electric motor at a small slide area large. Moreover, when the synchronous induction electric motor is used for the sealed type compressor, pressure loss of refrigerant gas passing through the non-filling part can be reduced.

According to the rotor of the synchronous induction electric motor of the Embodiment of the present invention, the non-filling part is provided at the slit which is the closest to the center of the rotor. Therefore, it is possible to make torque which is as an induction electric motor at a small slide area further large. Moreover, when the synchronous induction electric motor is used for the sealed type compressor, pressure loss of refrigerant gas passing through the non-filling part can be further reduced.

According to the rotor of the synchronous induction electric motor of the Embodiment of the present invention, as the non-filling part is provided close to the center of the slit, it is possible to retain the rotation balance.

According to the rotor of the synchronous induction electric motor of the Embodiment of the present invention, the rotor includes a gas vent hole which is penetrating in the direction of the rotational axis and which is shaped to make magnetic resistance in the direction of the d-axis small as much as possible. Therefore, even when a gas vent hole is provided, the decrease of inductance Ld in the direction of the d-axis generated by using the windings in the stator can be suppressed as much as possible. Consequently, reluctance torque becomes large, which makes the synchronous induction electric motor efficient.

According to the rotor of the synchronous induction electric motor of the Embodiment of the present invention, the gas vent hole has a short axis, and a long axis which is in the direction of the d-axis and in the radial direction. Accordingly, since the decrease of inductance Ld in the direction of the d-axis generated by using the windings in the stator can be suppressed as much as possible, reluctance torque becomes large, which makes the synchronous induction electric motor efficient.

According to the rotor of the synchronous induction electric motor of the Embodiment of the present invention, as the gas vent hole is an oval, the decrease of inductance Ld in the direction of the d-axis generated by using the windings in the stator can be suppressed as much as possible. Then, reluctance torque becomes large, which makes the synchronous induction electric motor efficient.

According to the rotor of the electric motor of the Embodiment of the present invention, the gas vent hole penetrating in the direction of the rotational axis and being concavo-convex inside is formed in a layered steel plate. Therefore, in the case that the electric motor according to the present Embodiment is used for a sealed type compressor, lubricating oil contained in refrigerant gas is separated when the refrigerant gas passes the gas vent hole. Then, the amount of oil circulation in the refrigerant circuit can be reduced, which enhances the performance of the refrigerant circuit. Moreover, it is not necessary to separately install a board for oil separation, and it is possible to reduce the amount of lubricating oil enclosed in the sealed type compressor because there is little lubricating oil carried out of the sealed type compressor. Consequently, lowering the cost can be realized. Furthermore, as an oil reservoir part can be small, the sealed type compressor can be downsized. As little lubricating oil is carried out of the sealed type compressor, no seizure is generated in the sealed type compressor, which improves the reliability.

According to the rotor of the electric motor of the Embodiment of the present invention, the rotor includes a first block made by layering one or a plurality of first rotor-punching plates in which the gas vent hole whose one end is closed is provided, a second block made by layering one or a plurality of second rotor-punching plates in which the gas vent hole wholly open is provided, and a third block made by layering one or a plurality of third rotor-punching plates in which the gas vent hole whose end opposite to the closed one end of the first rotor-punching plates is closed is provided, and the gas vent hole penetrating in the direction of the rotational axis and being concavo-convex inside is formed by combining the first block, the second block and the third block. The gas vent hole, being concavo-convex inside, can be easily formed.

According to the rotor of the electric motor of the Embodiment of the present invention, the gas vent hole penetrating in the direction of the rotational axis and being concavo-convex inside is formed by repeatedly layering the first block, the second block, and the third block in order. Consequently, it is possible to form the gas vent hole whose concavo-convex inside is aligned.

According to the rotor of the electric motor of the Embodiment of the present invention, since the gas vent hole in the rotor is circular, a punching mold for the rotor-punching plate can be easily produced.

According to the rotor of the electric motor of the Embodiment of the present invention, since the gas vent hole in the first rotor-punching plate and the gas vent hole in the third rotor-punching plate are semicirculars, a punching mold for the rotor-punching plate can be easily produced.

According to the rotor of the electric motor of the Embodiment of the present invention, the gas vent hole penetrating in the direction of the rotational axis and formed in the layered steel plate is provided, and the gas vent hole is wholly open at the entrance side of a gas flow, and a part inside the gas vent hole, at an outer circumferential side of the rotor, is closed at the exit side of the gas flow. When the rotor of the electric motor according to the present Embodiment is used for a sealed type compressor, centrifugal force at the exit side of the gas prevents lubricating oil contained in refrigerant gas from going out of the rotor exit, and at the entrance side of the refrigerant gas, separated lubricating oil becomes easy to return into the sealed type compressor. Therefore, the refrigerant gas can smoothly pass, lubricating oil in the refrigerant gas can be separated, and the amount of oil circulation in the refrigerant circuit can be reduced, which improves the performance as a refrigerant circuit. Moreover, it is possible to reduce the amount of lubricating oil to be enclosed in the sealed type compressor because there is little lubricating oil carried out of the sealed type compressor, which realizes lowering the cost. Furthermore, as an oil reservoir part can be small, the sealed type compressor can be downsized. As little lubricating oil is carried out of the sealed type compressor, no seizure is generated in the sealed type compressor, which improves the reliability.

According to the rotor of the electric motor of the Embodiment of the present invention, the gas vent hole in the rotor of the electric motor is wholly open at the entrance side of the gas flow and a part inside the gas vent hole, at an outer circumferential side of the rotor, is closed at the exit side of the gas flow. In the case that the rotor of the electric motor according to the present Embodiment is used for a sealed type compressor, lubricating oil in the refrigerant gas is separated when the refrigerant gas passes through the gas vent hole, centrifugal force at the exit side of the gas flow prevents the lubricating oil from going out of the rotor exit, and at the entrance side of the refrigerant gas, separated lubricating oil becomes easy to return into the sealed type compressor. Therefore, no seizure is generated in the sealed type compressor, which improves the reliability.

According to the rotor of the electric motor of the Embodiment of the present invention, the rotor includes a first block made by layering one or a plurality of first rotor-punching plates in which the gas vent hole whose one end is closed is provided, a second block made by layering one or a plurality of second rotor-punching plates in which the gas vent hole wholly open is provided, and a third block made by layering one or a plurality of third rotor-punching plates in which the gas vent hole whose end opposite to a closed one end of the first rotor-punching plates is closed is provided, the entrance side of the gas flow is composed of the second block, the exit side of the gas flow is composed of the first block or the third block, and a part of the gas vent hole at the exit side of the gas flow is closed at the outer circumferential side of the rotor. Accordingly, it is easy to produce a gas vent hole which is wholly open at the entrance side of the gas flow, and a part, at the outer circumferential side of the rotor, of which is closed, at the exit side of the gas flow.

According to the rotor of the electric motor of the Embodiment of the present invention, the gas vent hole is shaped to make magnetic resistance in the direction of d-axis small as much as possible. In the case that the rotor of the electric motor according to the present Embodiment is used for a sealed type compressor, lubricating oil in the refrigerant gas can be separated when the refrigerant gas passes through the gas vent hole. Moreover, the decrease of inductance Ld in the direction of the d-axis generated by using the windings in the stator can be suppressed as much as possible, reluctance torque becomes large, which makes the electric motor efficient.

According to the synchronous induction electric motor of the Embodiment of the present invention, since the rotor of the synchronous induction electric motor is used, the efficiency is enhanced.

According to the synchronous induction electric motor of the Embodiment of the present invention, since the rotor of the electric motor is applied, the reliability of the sealed type compressor is enhanced when the synchronous induction electric motor is used for the sealed type compressor.

According to the induction electric motor of the Embodiment of the present invention, since the rotor of the electric motor is applied, the reliability of the sealed type compressor is enhanced when the induction electric motor is used for the sealed type compressor.

According to the brushless DC motor of the Embodiment of the present invention, since the rotor of the synchronous induction electric motor or the rotor of the electric motor is applied, the reliability of the sealed type compressor is enhanced when the brushless DC motor is used for the sealed type compressor.

According to the sealed type compressor of the Embodiment of the present invention, since the synchronous induction electric motor, the induction electric motor, or the brushless DC motor is applied, the COP (coefficient of performance) and the reliability of the sealed type compressor is enhanced.

According to the refrigerator of the Embodiment of the present invention, since the sealed type compressor is used, the performance and the reliability is enhanced.

According to the air conditioner of the Embodiment of the present invention, since the sealed type compressor is used, the performance and the reliability is enhanced.

According to the producing method of the rotor of the synchronous induction electric motor of the Embodiment of the present invention, when the slot and the slit of the rotor are filled up with the aluminum by die-casting, a plate-type mold is put onto the non-filling part beforehand, the die-casting is performed, and the plate-type mold is taken out when the rotor of a mold of the die-casting is taken out. Therefore, the non-filling part where no aluminum is filled up can be easily formed.

According to the rotor of the synchronous induction electric motor of the Embodiment of the present invention, the slit is located to be in parallel to the d-axis. Therefore, the inductance in the direction of the d-axis generated by using the windings in the stator can be large, and the reluctance torque can be generated.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A rotor of a synchronous induction electric motor comprising:
    a slot for generating induction torque, and
    a slit for generating reluctance torque,
    wherein the slot and the slit are filled up with aluminum which is short-circuited by an end-ring at each of both ends of the rotor, and the rotor includes a gas vent hole penetrating in a direction of a rotational axis,
    wherein the gas vent hole has a cross-section shape with a short axis and a lone axis, and wherein the long axis extends in a direction of a d-axis of the rotor and extends in a radial direction of the rotor, and
    wherein the gas vent hole is wholly open at an entrance side of a gas flow, and the gas vent hole has a flow-restricting portion at an outer circumferential side of the rotor at an exit side of the gas flow.

2. A rotor of an electric motor comprising:
    a layered steel plate made by layering a plurality of electromagnetic steel plates, in which a gas vent hole is formed that penetrates in a direction of a rotational axis and is concavo-convex inside along an axial length thereof,
    wherein the gas vent hole is wholly open at an entrance side of a gas flow, and the gas vent hole has a flow-restricting portion at an outer circumferential side of the rotor at an exit side of the gas flow.

3. A rotor of an electric motor comprising:
    a layered steel plate made by layering one or a plurality of electromagnetic steel plates, in which a gas vent hole is formed that penetrates in a direction of a rotational axis and is concavo-convex inside,
    wherein the rotor includes a first block made by layering one or a plurality of first rotor-punching plates in which the gas vent hole has a flow-restricting side is provided, a second block made by layering one or a plurality of second rotor-punching plates in which the gas vent hole that is wholly open is provided, and a third block made by layering one or a plurality of third rotor-punching plates in which the gas vent hole has a flow-restricting side opposite to the flow-restricting side of the first rotor-punching plates is provided, and
    wherein the gas vent hole is formed by combining the first block, the second block and the third block.

4. The rotor of the electric motor of claim 3, wherein the gas vent hole is formed by repeatedly layering the first block, the second block, and the third block in order.

5. The rotor of the electric motor of claim 3, wherein the gas vent hole in the second rotor punching plate is circular.

6. The rotor of the electric motor of claim 5, wherein the gas vent hole in the first rotor punching plate and the gas vent hole in the third rotor-punching plate are semicirculars.

7. A rotor of an electric motor including a layered steel plate made by layering one or a plurality of electro-magnetic steel plates, comprising:
    a gas vent hole penetrating in a direction of a rotational axis and formed in the layered steel plate,
    wherein the gas vent hole is wholly open at an entrance side of a gas flow, and the gas vent hole has a flow-restricting portion at an outer circumferential side of the rotor at an exit side of the gas flow.

8. The rotor of the electric motor of claim 7, wherein the rotor includes a first block made by layering one or a plurality of first rotor-punching plates in which the gas vent hole having a flow-restricting portion is provided, a second block made by layering one or a plurality of second rotor-punching plates in which the gas vent hole wholly open is provided, and a third block made by layering one or a plurality of third rotor-punching plates in which the gas vent hole has a flow-restricting portion opposite to the flow-restricting portion of the first rotor-punching plates is provided, and wherein the entrance side of the gas flow is composed of the second block, and the exit side of the gas flow is composed of one of the first block and the third block, and the gas vent hole at the exit side of the gas flow includes a flow-restricting portion.

9. A rotor of an electric motor comprising:
    a layered steel plate made by layering one or a plurality of electromagnetic steel plates, in which a gas vent hole is formed that penetrates in a direction of a rotational axis and is concavo-convex inside,
    wherein the gas vent hole is wholly open at an entrance side of a gas flow, and the gas vent hole has a flow-restricting portion at an outer circumferential side of the rotor at an exit side of the gas flow.

10. A rotor of an electric motor comprising:
    a layered steel plate made by layering a plurality of electromagnetic steel plates, in which a gas vent hole is formed that penetrates in a direction of a rotational axis and is concavo-convex inside along an axial length thereof,
    wherein the gas vent hole is shaped to make magnetic resistance in a direction of d-axis as small as possible.

11. The rotor of the electric motor of claim 10, wherein the gas vent hole is wholly open at an entrance side of a gas flow, and the gas vent hole has a flow-restricting portion at an outer circumferential side of the rotor at an exit side of the gas flow.

12. A synchronous induction electric motor comprising a rotor of an electric motor comprising:
    a layered steel plate made by layering a plurality of electromagnetic steel plates, in which a gas vent hole is formed that penetrates in a direction of a rotational axis and is concavo-convex inside along an axial length thereof,
    wherein the gas vent hole is wholly open at an entrance side of a gas flow, and the gas vent hole has a flow-restricting portion at an outer circumferential side of the rotor at an exit side of the gas flow.

13. An induction electric motor comprising a rotor of an electric motor comprising:
    a layered steel plate made by layering a plurality of electromagnetic steel plates, in which a gas vent hole is formed that penetrates in a direction of a rotational axis and is concavo-convex inside along an axial length thereof,
    wherein the gas vent hole is wholly open at an entrance side of a gas flow, and the gas vent hole has a flow-restricting portion at an outer circumferential side of the rotor at an exit side of the gas flow.

* * * * *